United States Patent
Laitenberger et al.

(10) Patent No.: US 10,752,348 B2
(45) Date of Patent: Aug. 25, 2020

(54) ADJUSTABLE SCISSOR LINK

(71) Applicant: Sikorsky Aircraft Corporation, Stratford, CT (US)

(72) Inventors: Kevin Laitenberger, Beacon Falls, CT (US); Stephen V. Poulin, Milford, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 537 days.

(21) Appl. No.: 15/531,223

(22) PCT Filed: Oct. 16, 2015

(86) PCT No.: PCT/US2015/056005
§ 371 (c)(1),
(2) Date: May 26, 2017

(87) PCT Pub. No.: WO2016/109004
PCT Pub. Date: Jul. 7, 2016

(65) Prior Publication Data
US 2018/0297696 A1    Oct. 18, 2018

Related U.S. Application Data

(60) Provisional application No. 62/094,588, filed on Dec. 19, 2014.

(51) Int. Cl.
*B64C 27/605* (2006.01)
*B64C 27/10* (2006.01)

(52) U.S. Cl.
CPC .......... *B64C 27/605* (2013.01); *B64C 27/10* (2013.01)

(58) Field of Classification Search
CPC ..... B64C 27/10; B64C 27/605; F16B 7/0493; F16C 7/00; F16C 7/02; F16D 3/38;
(Continued)

(56) References Cited

U.S. PATENT DOCUMENTS 541,997 A * 7/1895 Fravega et al. .......... F16D 3/38
464/119
2,101,317 A * 12/1937 Lemieux .................. E04G 7/14
403/53

(Continued)

FOREIGN PATENT DOCUMENTS

WO      9705017 A1    2/1997
WO   2014113261 A1    7/2014

OTHER PUBLICATIONS

ISR Written Opinion; International Application No. PCT/US15/56005; International Filing Date: Oct. 16, 2015; dated Aug. 22, 2016; pp. 1-5.

(Continued)

*Primary Examiner* — Josh Skroupa
(74) *Attorney, Agent, or Firm* — Cantor Colburn LLP

(57) ABSTRACT

A scissor link includes a first component defining a first bore and including first outer pads defining first and second holes and a first recession defining a first threaded hole, a second component defining a second bore and including second outer pads defining third and fourth holes and a second recession defining a second threaded hole, a shim disposable between the first and second outer pads of the first and second components, a stud to engage with each of the first and second threaded holes to tighten the first and second components about the shim and flanking bolts insertible through respective pairs of the first through fourth holes of the first and second components.

13 Claims, 5 Drawing Sheets

(58) Field of Classification Search
CPC ............... F16D 3/40; Y10T 403/32041; Y10T 403/32049; Y10T 403/32221; Y10T 403/4617; Y10T 403/4621; Y10T 403/7182; Y10T 403/7188; Y10T 403/7194; Y10T 403/75
USPC ..... 403/57, 58, 79, 235, 236, 398, 399, 400, 403/408.1
See application file for complete search history.

(56) References Cited

U.S. PATENT DOCUMENTS

| | | | | |
|---|---|---|---|---|
| 4,073,345 A | | 2/1978 | Miller | |
| 4,482,264 A | * | 11/1984 | Kodera | A01K 91/03 403/58 |
| 4,561,797 A | * | 12/1985 | Aldridge | A01D 75/30 403/58 |
| 4,611,971 A | | 9/1986 | Aubry et al. | |
| 4,702,722 A | * | 10/1987 | Narue | F16D 3/40 464/134 |
| 4,711,461 A | * | 12/1987 | Fromberg | B60D 1/02 403/57 |
| 4,729,707 A | * | 3/1988 | Takahashi | F16B 35/042 403/45 |
| 4,836,485 A | * | 6/1989 | Cooper | B60R 11/00 403/79 |
| 4,900,183 A | * | 2/1990 | Souchko | F16B 7/0493 403/400 |
| 5,198,830 A | * | 3/1993 | Lin | H01Q 1/125 248/183.2 |
| 5,393,162 A | * | 2/1995 | Nissen | B66D 3/04 403/79 |
| 5,599,129 A | * | 2/1997 | Clifton | F16G 11/00 403/79 |
| 5,624,232 A | | 4/1997 | Certain | |
| 5,765,851 A | * | 6/1998 | Parent | B60D 1/143 280/491.1 |
| 5,873,431 A | * | 2/1999 | Butler | B62D 12/00 180/418 |
| 6,083,108 A | * | 7/2000 | Grubish | F16D 3/38 403/109.1 |
| 6,682,292 B2 | | 1/2004 | Estes | |
| 7,369,672 B2 | * | 5/2008 | Hirschhorn | F16M 11/041 248/917 |
| 7,438,492 B2 | * | 10/2008 | Naudet | F16C 7/06 403/79 |
| 7,954,777 B2 | * | 6/2011 | Bohm | F16M 11/10 403/57 |
| 9,879,716 B2 | * | 1/2018 | Heath | F16C 11/06 |
| 2004/0018042 A1 | * | 1/2004 | Smith | H02G 7/04 403/78 |
| 2010/0133376 A1 | | 6/2010 | Foyer et al. | |
| 2011/0020060 A1 | * | 1/2011 | Owyang | B62J 25/00 403/408.1 |
| 2013/0149023 A1 | | 6/2013 | Wiecko et al. | |
| 2016/0190675 A1 | * | 6/2016 | Dasanayaka | H01Q 1/1207 244/131 |

OTHER PUBLICATIONS

ISR, Notification of Transmittal of International Search Report ISR; International Application No. PCT/US15/56005; International Filing Date: Oct. 16, 2015; dated Aug. 22, 2016; pp. 1-8.

* cited by examiner

ADJUSTABLE SCISSOR LINK

CROSS REFERENCE TO RELATED APPLICATIONS

This application is a National Stage application of PCT/US2015/056005, filed Oct. 16, 2015, which claims the benefit of U.S. Provisional Application No. 62/094,588, filed Dec. 19, 2014, both of which are incorporated by reference in their entirety herein.

STATEMENT REGARDING FEDERALLY SPONSORED RESEARCH OR DEVELOPMENT

This invention was made with government support under agreement number W911W6-13-2-0003 awarded by the Army. The government has certain rights in the invention.

BACKGROUND OF THE INVENTION

The subject matter disclosed herein relates to a scissor link and, more particularly, to an adjustable scissor link for use as a rotating scissor and pitch control rod in a coaxial, counter-rotating helicopter.

Control of a rotary-wing aircraft, such as a vertical takeoff and landing (VTOL) aircraft or helicopter, is affected through cyclic and collective pitch control. Blade pitch control of a rotary-wing aircraft main rotor system is typically achieved through a swashplate assembly which transfers the motion of non-rotating control members within a stationary field to the rotating members within a rotational field.

The swashplate assembly generally includes two rings connected by a series of bearings with one swashplate ring connected to the airframe/gearbox (stationary field), and the other swashplate ring connected to a rotor hub (rotational field). Apart from rotary motion, the rotationally stationary swashplate ring and the rotational swashplate ring otherwise move as a unitary component.

BRIEF DESCRIPTION OF THE INVENTION

According to one aspect of the invention, a scissor link is provided and includes a first component defining a first bore and including first outer pads defining first and second holes and a first recession defining a first threaded hole, a second component defining a second bore and including second outer pads defining third and fourth holes and a second recession defining a second threaded hole, a shim disposable between the first and second outer pads of the first and second components, a stud to engage with each of the first and second threaded holes to tighten the first and second components about the shim and flanking bolts insertible through respective pairs of the first through fourth holes of the first and second components.

In accordance with additional or alternative embodiments, the first and second components are oriented orthogonally such that a first axis of the first bore is substantially orthogonal to a second axis of the second bore.

In accordance with additional or alternative embodiments, a first shaft is extendible through the first bore and a spherical bearing or second shaft is disposable in or extendible through the second bore.

In accordance with additional or alternative embodiments, the shim is selectable from a set of shims of varying thicknesses.

In accordance with additional or alternative embodiments, each shim in the set of shims has a fixed thickness.

In accordance with additional or alternative embodiments, the shim includes a concave edge disposable to extend around a side of the stud.

In accordance with additional or alternative embodiments, the stud includes a bolt portion disposable proximate to the concave edge.

In accordance with additional or alternative embodiments, the stud threadably engages with each of the first and second threaded holes and the flanking bolts threadably engage with the first and second holes of the first component and with the third and fourth holes of the second component.

According to another aspect of the invention, a scissor link is provided and includes a first component including a clevis with a bore for shaft connection, two outer pillars and a center pillar having right-handed threading of a first pitch, a second component including a lug with a bore for shaft connection, two flanges, which are connectable with the outer pillars, and a center pillar having right-handed threading of a second pitch and a connection assembly including a threaded barrel receptive of the center pillars at opposite ends thereof. The threaded barrel has first and second pitch threading at the opposite ends thereof to engage with the first and second pitched right-handed threading of the center pillars, respectively, such that the first and second components are settable at varying distances from each other.

In accordance with additional or alternative embodiments, the first and second components are oriented orthogonally such that a first axis of the bore of the first component is substantially orthogonal to a second axis of the bore of the second component.

In accordance with additional or alternative embodiments, the two outer pillars and the center pillar have a trident configuration.

In accordance with additional or alternative embodiments, the scissor link includes jam nuts at each of the flanges to secure the two outer pillars.

In accordance with additional or alternative embodiments, the clevis of the first component includes first and second clevis arms that are each formed to define a shaft bore through which a pivot beam shaft is extendible, and the lug of the second component includes first and second lug arms that are each formed to define a spherical bearing or shaft bore in or through which a spherical bearing or shaft of a rotating swashplate is disposable or extendible.

In accordance with additional or alternative embodiments, the second pitch threading is greater than the first pitch threading.

In accordance with additional or alternative embodiments, the connection assembly includes a lock washer, a jam nut and the threaded barrel.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

In a coaxial, counter-rotating helicopter where upper rotor controls are below the gearbox and a pivot beam configuration is used to transmit servo inputs to control rods located inside the main shaft, a scissor link can serve a dual purpose as a rotating scissor and a pitch control rod. However, since scissor links serving as rotating scissors and pitch control rods are not adjustable, scissor links do not permit blade track and balance operations to be performed easily or efficiently.

In many cases, in order for the blade track and balance operations to be performed at all where scissor links are used as rotating scissors and pitch control rods, entire linkages needs to be installed and reinstalled with successively resized scissor links for each operational iteration in order to identify an optimum configuration. This process is time consuming and expensive.

As will be described below, a dual purpose adjustable scissor link is provided for use on for example a compound or coaxial, counter-rotating helicopter although it will be understood that the scissor link can be used in other types of helicopters as well. The scissor link has upper and lower components with the upper component having a clevis on one end with bores for journal bearings to connect to a pivot beam and a second end having two outer pads and a center recession with threaded holes on each pad and the recession. The lower component has a lug on one end with a bore for attachment to a spherical bearing or shaft in the rotating swashplate and a second end having two outer pads and a center recession with a threaded hole in the recession and through holes on each pad.

The upper and lower components are connected via the center recessions using a double ended stud with right handed threads on one end and left handed threads on the opposite end and hexagonal flats in the center. A fixed thickness shim is placed between the upper and lower components and is selectable from a set of for example 52 shims of varying thickness in increments of 0.002" to provide adjustability and precision. The two side pads on each component are used to lock the scissor link length using bolts that pass through the lower component and thread into the upper component. This connection between the side pads provides a load path for axial control rod loading and the scissor moment.

Figure 1A:
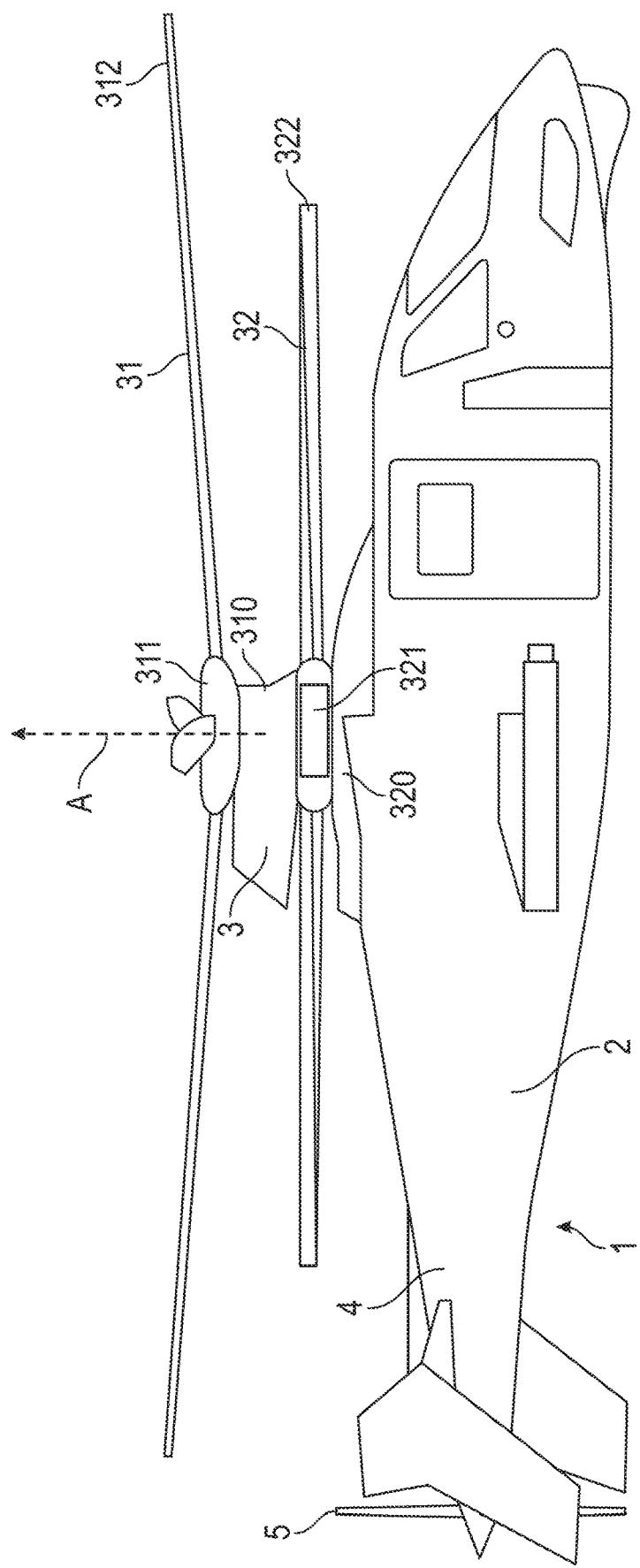
FIG. 1A is a side view of a coaxial, counter-rotating helicopter in accordance with embodiments.

With reference to FIG. 1A, an aircraft 1 is provided. The aircraft 1 may be configured for example as a coaxial, counter-rotating aircraft and thus may include an airframe 2 having an upper portion at which a coaxial, counter-rotating main rotor assembly 3 is disposed and a tail portion 4 at which an auxiliary propulsor 5 is disposed. The airframe 2 is configured to accommodate a pilot and, in some cases, one or more crewmen or passengers. The airframe 2 is further configured to encompass an engine, a transmission unit and a flight computer. The coaxial, counter-rotating main rotor assembly 3 has an upper rotor 31 and a lower rotor 32. The upper rotor 31 includes an upper rotor shaft 310, a hub 311 and rotor blades 312 extending outwardly from the hub 311. The lower rotor 32 includes a lower rotor shaft 320, a hub 321 and rotor blades 322 extending outwardly from the hub 321.

The upper and lower rotor shafts 310 and 320 are driven to rotate in opposite directions about a common rotational axis A by the engine and the transmission unit whereby the rotor blades 312, 322 rotate in opposite directions about the hubs 311, 321 to generate lift for the aircraft. Similarly, the auxiliary propulsor 5 is driven by the engine and the transmission unit to generate thrust for the aircraft 1. The flight computer controls various operations of the engine and the transmission unit as well as cyclic and collective pitching of the rotor blades 312, 322 in accordance with pilot inputted commands and current flight conditions.

Figure 1B:
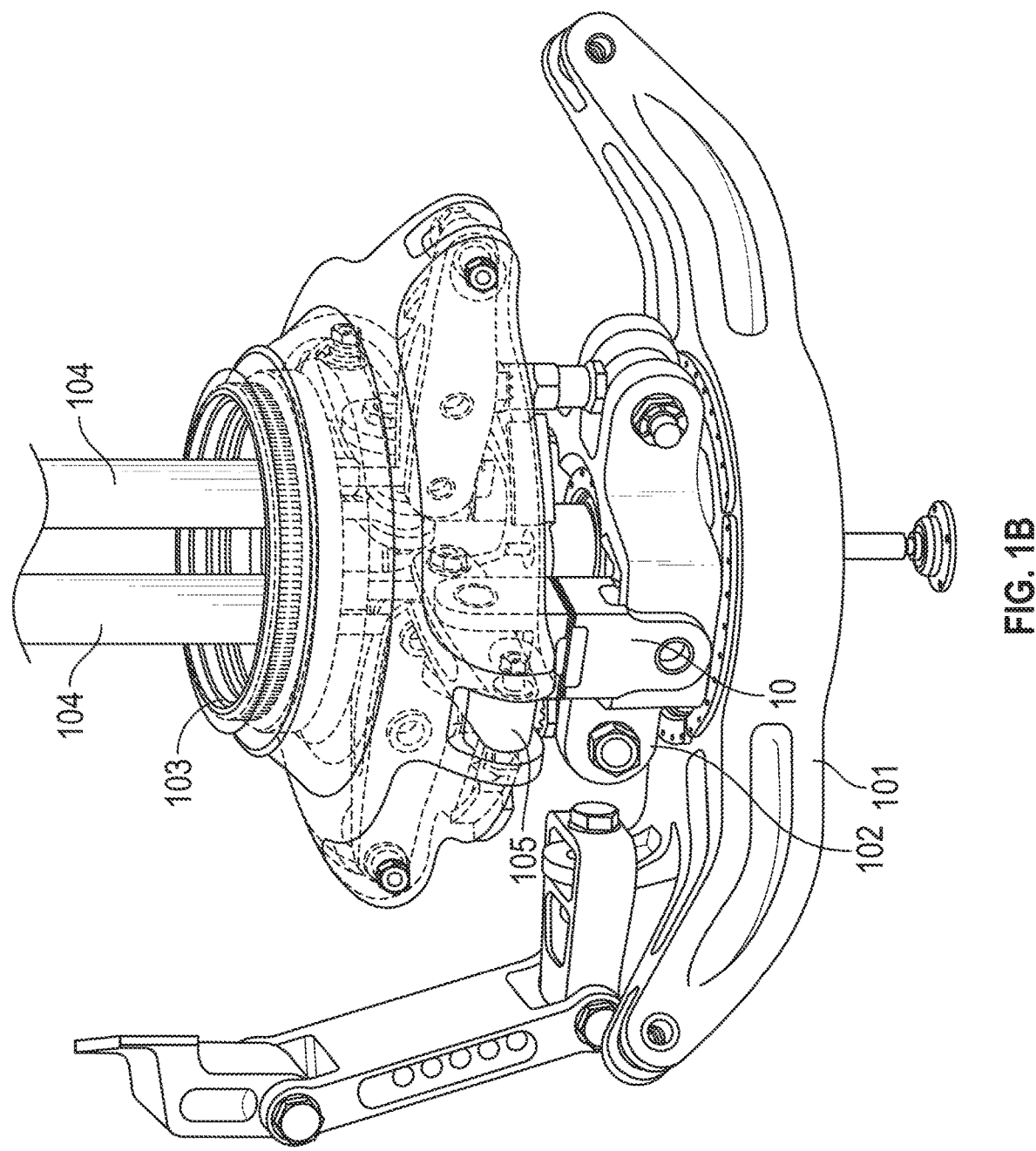
FIG. 1B is a perspective view of a rotor shaft and rotor control system in accordance with embodiments.
Figure 2:
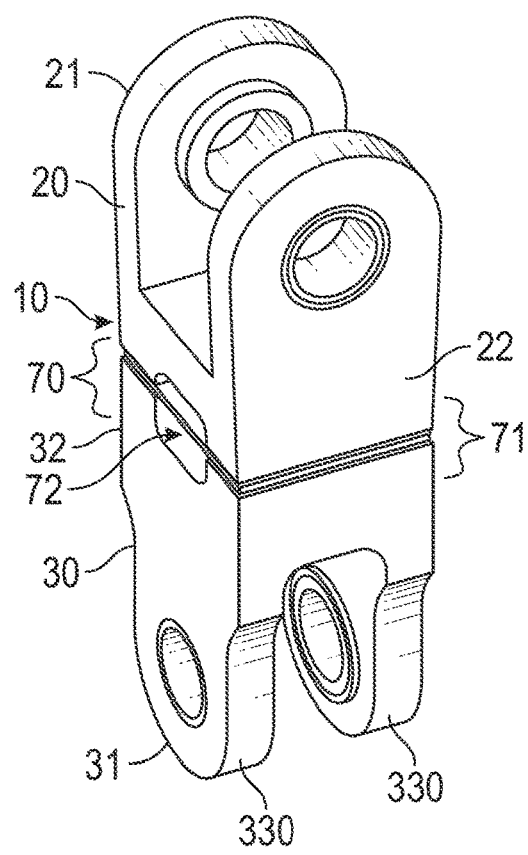
FIG. 2 is a perspective view of a scissor link in accordance with embodiments.
Figure 3:
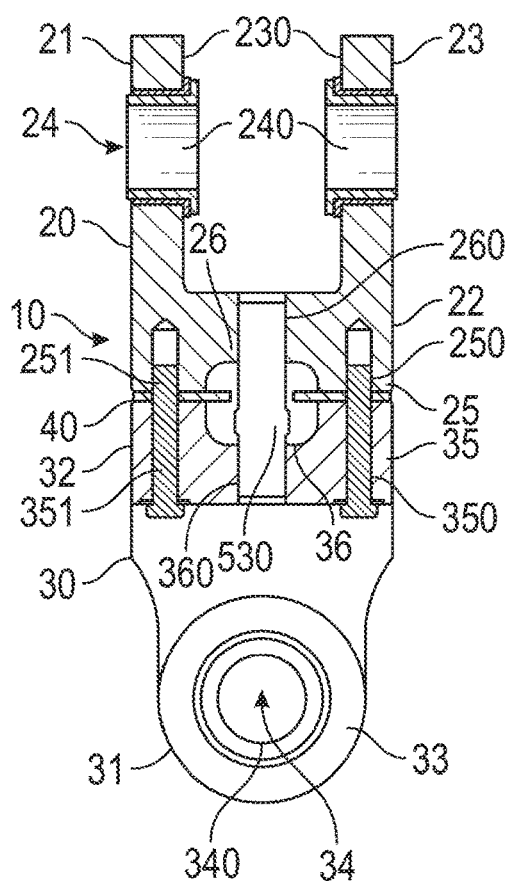
FIG. 3 is a side view of the scissor link of FIG. 2.

The airframe 2 also encompasses a gearbox, which is disposed generally in the upper portion. Controls for at least the rotor blades 312 of the upper rotor 31 are disposed below this gearbox and include a pivot beam configuration and a scissor link 10, which will be described below. This pivot beam configuration is used to transmit servo inputs to control rods located inside the upper rotor shaft 310. The scissor link 10 serves a purpose as a rotating scissor link and a pitch control rod and, in this capacity, is adjustable in its length-wise dimension as will be described below. The adjustability of the scissor link 10 permits blade track and balance operations to be performed with respect to the rotor blades 312 easily and efficiently With reference to FIGS. 1A and 1B, an upper rotor swashplate assembly for the aircraft 1 of FIG. 1A (i.e., a helicopter) is also provided and includes the upper rotor shaft 310, which is disposed to support rotation of the upper rotor 31, a stationary swashplate 101 that is ultimately connected to the airframe 2, a rotating swashplate 102 disposed to rotate relative to the stationary swashplate 101, a mixer housing 103 and the scissor links 10.

The mixer housing 103 rotates with the upper rotor shaft 310 and is disposed in or proximate to the upper rotor shaft 310 to surround primary pitch control rods 104 for association with individual rotor blades 322. The mixer housing 103 may be attached to the upper rotor shaft 310 such that the mixer housing 103 rotates with the upper rotor shaft 310. The primary pitch control rods 104 may be provided in a group of four to respectively correspond with each of four rotor blades 322 and are respectively coupled to four elongate elements or walking beams 105. Each of the walking beams 105 is provided as an elongate element that is pivotable relative to the mixer housing 103. Such pivoting causes the pitch control rods 104 to correspondingly translate or swing upward or downward.

Although the mixer housing 103 has been described as a feature that surrounds the primary pitch control rods 104, it is understood that this is not necessary in all cases and that alternative embodiments exist in which this is not the case. In such alternative embodiments, the mixer housing 103 may be disposed within a grouping of the primary pitch control rods 104 or to a side of the primary pitch control rods 104. In addition, although the primary pitch control rods 104 and the walking beams 105 are described as being provided in groups of four, it is understood that this is not necessary and that more or less number of each can be employed.

Each of the scissor links 10 has opposite ends that are coupled to a pivot beam (i.e., the walking beams 105) and to a spherical bearing or shaft of the rotating swashplate 102. Prior to use, the scissor links 10 are axially adjusted as described below to provide for blade tracking and, once the axial adjustment is completed, serve to control the position of the primary pitch control rods 104 in accordance with a location and orientation of the rotating swashplate 102 via the walking beams 105.

In accordance with aspects of the invention, a pair of scissor links 10 is provided as two axially adjustable scissor links 10 that are each configured to transmit rotation of the upper rotor shaft 310 to the rotating swashplate 102. The two axially adjustable scissor links 10 provide for balance and redundancy about the rotor axis although it is understood that less or more scissor links 10 may be used. In any case, the scissor links 10 exclusively transmit the rotation of the upper rotor shaft 310 to the rotating swashplate 102.

In some cases, the rotating swashplate 102 will tend to resist rotation due to bearing friction generated between the rotating swashplate 102 and the stationary swashplate 101. Without the presence of scissoring members, this bearing friction would cause the scissor links 10 to rotate or tilt relative to the walking beams 105. As a result, the rotation of the mixer housing 103 would be transmitted to the rotating swashplate 102 in a dragging formation. The couplings of the scissor links 10 resist the rotation/tilt, however, and prevent the dragging formation from taking effect.

With reference to FIGS. 2-6, the scissor link 10 includes an upper (or first) component 20, a lower (or second) component 30, a shim 40, a stud 50 and flanking bolts 60.

The upper component 20 includes a first end 21 and a second end 22, which is opposite the first end 21. At the first end 21, the upper component 20 includes a clevis 23 with a first bore 24 for connection to a pivot beam shaft, such as the walking beam 105 of FIG. 1B. The clevis 23 includes first and second clevis arms 230 that are each formed to define the first bore 24 as an aperture aligned with the aperture of the other arm 230. The first bore 24 is shown with journal bearings 240 at each arm 230 to encourage smooth rotation of the pivot beam shaft therein, although such bearings 240 are not required in all aspects. At the second end 22, the upper component 20 includes two first outer pads 25 and a first recessed portion 26. The two first outer pads 25 respectively define first and second threaded holes 250 and 251 as well as a first plane P1 (see FIG. 4). The first recessed portion 26 is disposed in a center of the second end 22 and is recessed from the first plane P1 towards the first end 21. The first recessed portion 26 defines a first threaded hole 260.

The lower component 30 includes a first end 31 and a second end 32, which is opposite the first end 31. At the first end 31, the lower component 30 includes a lug 33 with a second bore 34 for connection to a spherical bearing or shaft of the rotating swashplate. The lug 33 includes first and second lug arms 330 that are formed to define the second bore 34 as an aperture. While not required in all aspects, the shown second bore 34 includes flange bearings 340 at each lug arm 330 to encourage smooth rotation of the spherical bearing or shaft of the rotating swashplate therein. At the second end 32, the lower component 30 includes two second outer pads 35 and a second recessed portion 36. The two second outer pads 35 respectively define third and fourth holes 350 and 351 as well as a second plane P2 (see FIG. 4). The second recessed portion 36 is disposed in a center of the second end 32 and is recessed from the second plane P2 towards the first end 21. The second recessed portion 36 defines a second threaded hole 360.

When the scissor link 10 is assembled together, the upper and lower components 20 and 30 are oriented orthogonally with respect to each other and, in some cases, may be oriented such that the clevis 23 (and the first bore 24) and the lug 33 (and the second bore 34) are oriented perpendicularly with respect to one another. In addition, the respective first ends 21, 31 face away from each other and the respective second ends 22, 32 face toward each other such that the first and second outer pads 25, 35 and the first and second recessed portions 26, 36 respectively align in a complementary fashion. That is, when the scissor link 10 is assembled, the respective first and second outer pads 25, 35 cooperatively form first and second bulkheads 70 and 71 on opposite sides of the scissor link 10 and the respective first and second recessed portions 26, 36 cooperatively form a bore region 72 between the first and second bulkheads 70 and 71.

Figure 5:
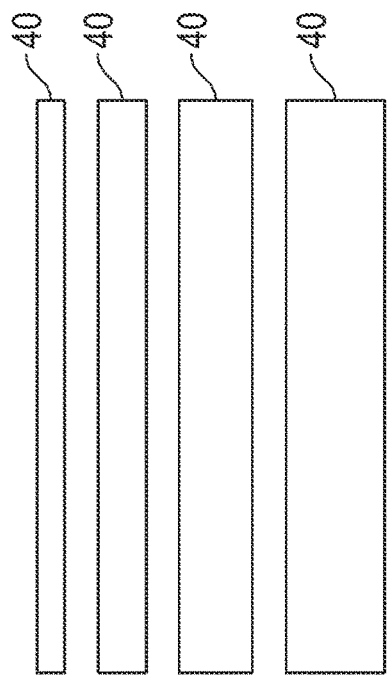
FIG. 5 is a side schematic view of a set of shims of varying thicknesses for use in the scissor link of FIGS. 2-4.

As shown in FIG. 5, the shim 40 is selected from a set of shims 40 of varying thicknesses. Each shim 40 is individually selectable for disposition between the first and second outer pads 25, 35 with the scissor link 10 assembled as described above such that the selected shim 40 bisects the bore region 72. With the varying thicknesses of the shims 40 in the set, the thickness of the selected shim 40 is determinative of an overall length between the first and second bores 24, 34 (see FIG. 3). Thus, the selection of the shim 40 can be employed to select the desired length and a desired overall length of the scissor link 10. More particularly, the selection of the shim 40 can be employed to select the desired length in accordance with blade track and balance operations performed with respect to the rotor blades 312.

In accordance with embodiments, each shim 40 may be formed of rigid materials such as metals, metallic alloys, ceramics or hardened plastics. In accordance with alternative embodiments, each shim 40 may be formed of compliant material, such as an elastomer, in order to dampen or otherwise reduce vibrations in the scissor link 10. In any case, each shim 40 may include side portions 401 and a central portion 402 interposed between the side portions 401. The side portions 401 are disposable between complementary pairs of the first and second outer pads 25, 35 and are formed to define grooves 403. The central portion 402 is disposable to at least partially bisect the bore region 72 and includes a concave edge 404.

The stud 50 may have first and second opposite ends 51 and 52 and a central portion 53 interposed between the first and second opposite ends 51 and 52. The first end 51 is disposable to engage with the first threaded hole 260 of the upper component 20 and the second end 52 is disposable to engage with the second threaded hole 360 of the lower component 30. The first and second opposite ends 51 and 52 may be provided with oppositely directed threading to threadably engage with complementary threading of the first and second threaded holes 260, 360. Thus, rotation of the stud 50 about its longitudinal axis in a first direction draws the upper and lower components 20 and 30 toward each other in a tightening manner about the selected shim 40 whereas rotation of the stud 50 about its longitudinal axis in a second direction causes the upper and lower components 20 and 30 to recede from each other in a loosening manner that allows the selected shim 40 to be installed or removed and replaced with another shim 40 of a different thickness.

The central portion 53 may be provided as a bolt portion 530. That is, the central portion 53 may have, for example, a hexagonal shape that can be manipulated by a wrench or a similar tool to rotate the stud about its longitudinal axis, although it is understood other shapes couple be used including square, octagonal or other shapes with edges. Access to the central portion 53 is provided by way of the central portion 53 being disposable in the bore region 72 and by way of the concave edge 404, which is disposable proximate to the central region 53.

Once the shim 40 of the desired thickness is selected and the upper and lower components 20 and 30 are tightened about the shim 40, the flanking bolts 60 are inserted through the third and fourth holes 350 and 351 of the lower component 30 to engage with the first and second threaded holes 250 and 251 of the upper component 20. To this end, the flanking bolts 60 and the first and second threaded holes 250 and 251 may be complementarily threaded such that the flanking bolts 60 threadably engage with the first and second threaded holes 250 and 251. Once the threaded engagement is achieved, the flanking bolts 60 provide for a load path for axial control rod loading and a scissor moment. The grooves 403 are slidably receptive of the flanking bolts 60 and permit the shim 40 to be removed from and inserted in between the upper and lower components 20 and 30 without wholly dis-assembling the scissor link 10 (the concave edge 404 performs a similar function in being slidably receptive of the stud 50).

Figure 6:
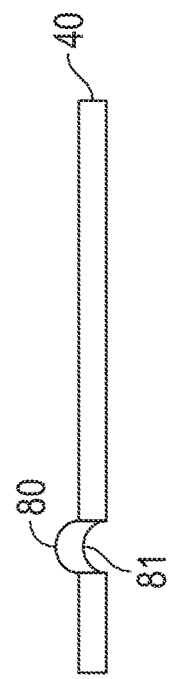
FIG. 6 is a side schematic view of a shim in accordance with an alternative embodiment.
Figure 4:
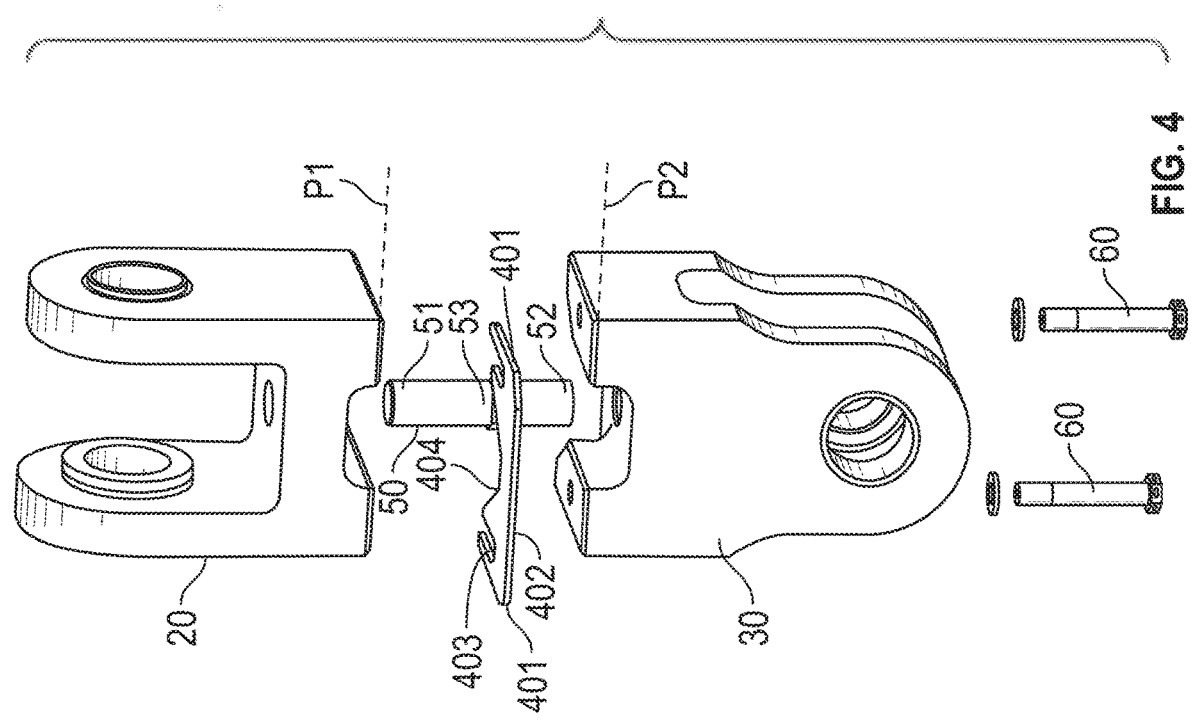
FIG. 4 is an exploded perspective view of various components of the scissor link of FIG. 2.

In accordance with additional embodiments and, with reference to FIG. 6, the shims 40 may be provided with dimples 80 and corresponding recesses 81 on their opposite faces at the side portions 401. In such cases, the first and second outer pads 25, 35 of the upper and lower components 20 and 30 may be similarly provided with corresponding recesses (though it is to be understood that the dimple-recess configuration can be reversed as well). In any case, the dimples 80 and the recesses 81 may be engageable to increase surface contact between the shim 40 and the upper and lower components 20 and 30 to thus form additional load pathways.

By incorporating a dual purpose scissor link in a coaxial, counter-rotating rotor assembly as described above, a need for separate pitch control rods and rotating scissors is eliminated thus reducing part count and weight. The method of adjustment described above provides for robust determination of an adjustment amount and is easy to execute.

Figure 7:
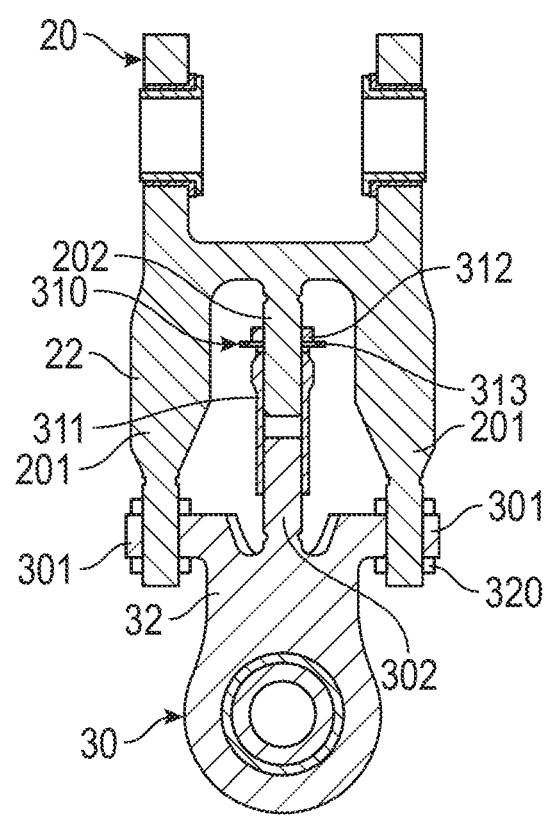
FIG. 7 is a side view of a scissor link in accordance with alternative embodiments.

With reference to FIG. 7 and, in accordance with further alternative embodiments, the second end 22 of the upper component 20 includes two outer pillars 201 and a center pillar 202 arranged in parallel with one another in a trident configuration 205. The center pillar 202 has right-handed threading of a first pitch. The second end 32 of the second component 30 has two flanges 301 and a center pillar 302. The outer flanges 301 are connectable with the outer pillars 201 and the center pillar 302 has right-handed threading of a second pitch, which may be greater or lesser than the first pitch. In addition, a connection assembly 310 is provided and includes a threaded barrel 311 that is receptive of the center pillars 202, 302 at opposite ends thereof. The threaded barrel 311 has first and second pitch threading at the opposite ends thereof to engage with the first and second thread pitched right-handed threading of the center pillars 202, 302, respectively, such that the upper and lower components 20 and 30 are settable with orthogonal relative orientations at varying distances from each other. Specifically, this difference in first and second thread pitch creates a displacement differential which changes the length of the scissor link 10.

During assembly, a jam nut 312 and a lock washer 313 are disposed about the center pillar 202 and are each receptive of the threaded barrel 311. Meanwhile, the threaded barrel 311 receives in the opposite ends thereof the center pillars 202, 302 with the flanges 301 being receptive of the outer pillars 201. The threaded barrel 311 is then rotated about its longitudinal axis to set the upper and lower components 20 and 30 at a desired distance from each other while the orthogonal orientations of the upper and lower components 20 and 30 are maintained by the reception of the outer pillars 201 in the flanges 301. Once the desired distance is obtained, the jam nut 312 and lock washer 313 lock the threaded barrel 311 in place and additional jam nuts 320 are provided to lock the outer pillars 201 in place relative to the flanges 301. The additional jam nuts 320 can be lock wired or cabled together. With the outer pillars 201 locked in place relative to the flanges 301, the outer pillars 201 and the flanges 301 form load pathways that can react the scissor moment and share control/axial loads.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A scissor link, comprising:
    a first component defining a first bore and including first outer pads defining first and second holes and a first recession defining a first threaded hole;
    a second component defining a second bore and including second outer pads defining third and fourth holes and a second recession defining a second threaded hole;
    a shim disposable between the first and second outer pads of the first and second components;
    a stud to engage with each of the first and second threaded holes to tighten the first and second components about the shim; and
    flanking bolts insertible through respective pairs of the first through fourth holes of the first and second components,
    wherein the shim includes at least one groove configured to slidably receive at least one of the flanking bolts such that the shim is removable between the first and second components.

2. The scissor link according to claim 1, wherein the first and second components are oriented orthogonally such that a first axis of the first bore is substantially orthogonal to a second axis of the second bore.

3. The scissor link according to claim 1, wherein a first shaft is extendible through the first bore and a spherical bearing or second shaft is disposable in or extendible through the second bore.

4. The scissor link according to claim 1, wherein the shim is selectable from a set of shims of varying thicknesses.

5. The scissor link according to claim 4, wherein each shim in the set of shims has a fixed thickness.

6. The scissor link according to claim 1, wherein the shim comprises a concave edge disposable to extend around a side of the stud.

7. The scissor link according to claim 6, wherein the stud comprises a bolt portion disposable proximate to the concave edge.

8. The scissor link according to claim 1, wherein the stud threadably engages with each of the first and second threaded holes and the flanking bolts threadably engage with the first and second holes of the first component and with the third and fourth holes of the second component.

9. The scissor link according to claim 1, wherein at least one of the first component and the second component is coupled to at least one pivot beam of an aircraft, said at least one pivot beam being pivotable relative to a mixer housing of the aircraft.

10. The scissor link according to claim 1, wherein at least one of the first component and the second component is coupled to a rotating swashplate of an aircraft such that the scissor link is configured to transmit rotation of an upper rotor shaft of the aircraft to the rotating swashplate.

11. The scissor link according to claim 1, wherein one of the first component and the second component is coupled to at least one pivot beam of an aircraft, said at least one pivot beam being pivotable relative to a mixer housing of the aircraft, and the other of the first component and the second component is coupled to a rotating swashplate of the aircraft such that the scissor link is configured to transmit rotation of an upper rotor shaft of the aircraft to the rotating swashplate.

12. The scissor link according to claim 11, wherein the mixer housing rotates with the upper rotor shaft and is disposed in or proximate to the upper rotor shaft configured to surround a plurality of pitch control rods of the aircraft, wherein the plurality of pitch control rods correspond with a plurality of rotor blades of an aircraft and at least one pitch control rod of the plurality of pitch control rods is coupled to said at least one pivot beam.

13. The scissor link according to claim 1, wherein the shim is selectable from a set of shims of varying thicknesses configured to correspond with a plurality of rotor blades of an aircraft.

* * * * *